F. B. BELL.
MEASURING DEVICE.
APPLICATION FILED JUNE 21, 1915.
1,332,594.
Patented Mar. 2, 1920.
3 SHEETS—SHEET 1.
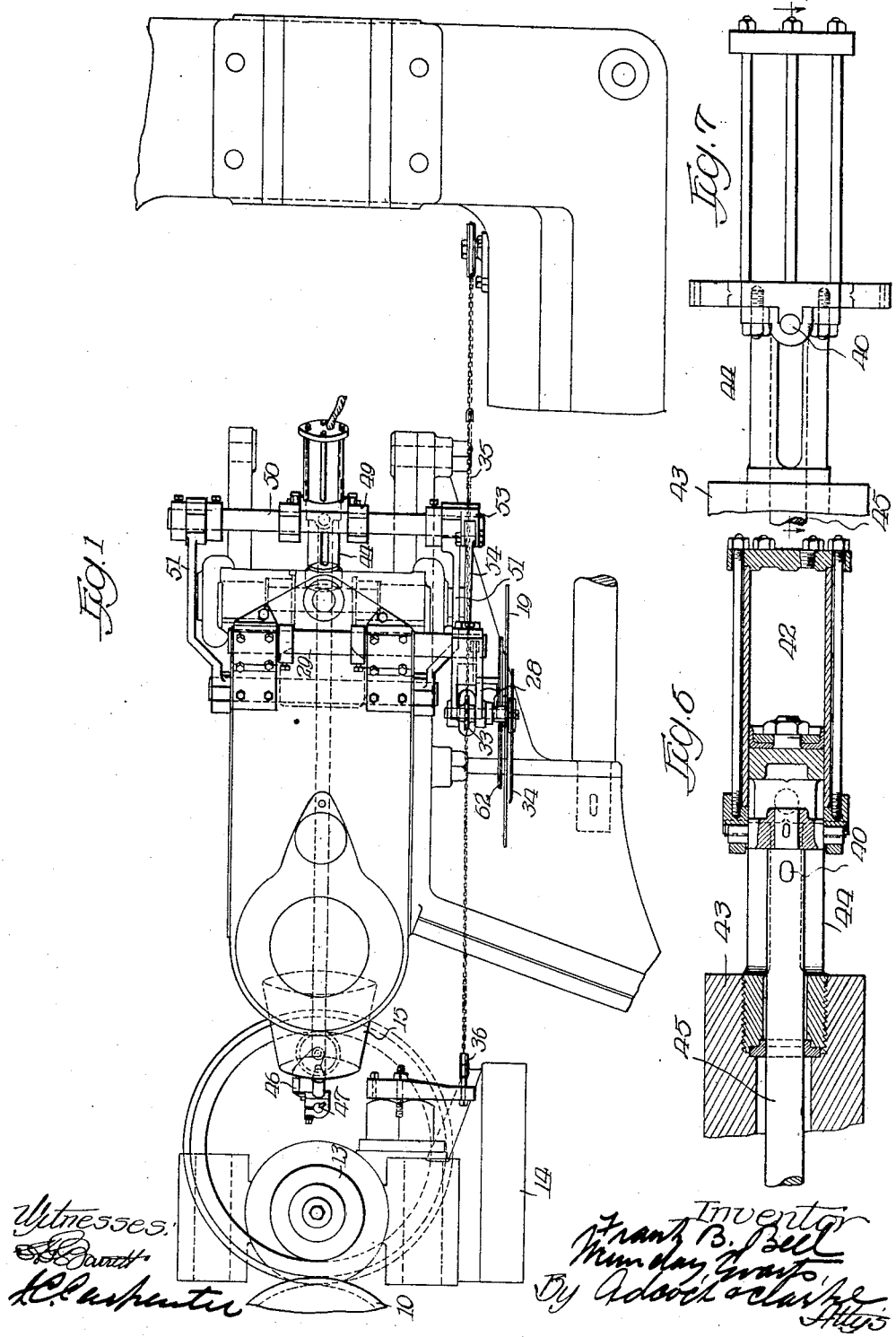

F. B. BELL.
MEASURING DEVICE.
APPLICATION FILED JUNE 21, 1915.
1,332,594.
Patented Mar. 2, 1920.
3 SHEETS—SHEET 2.
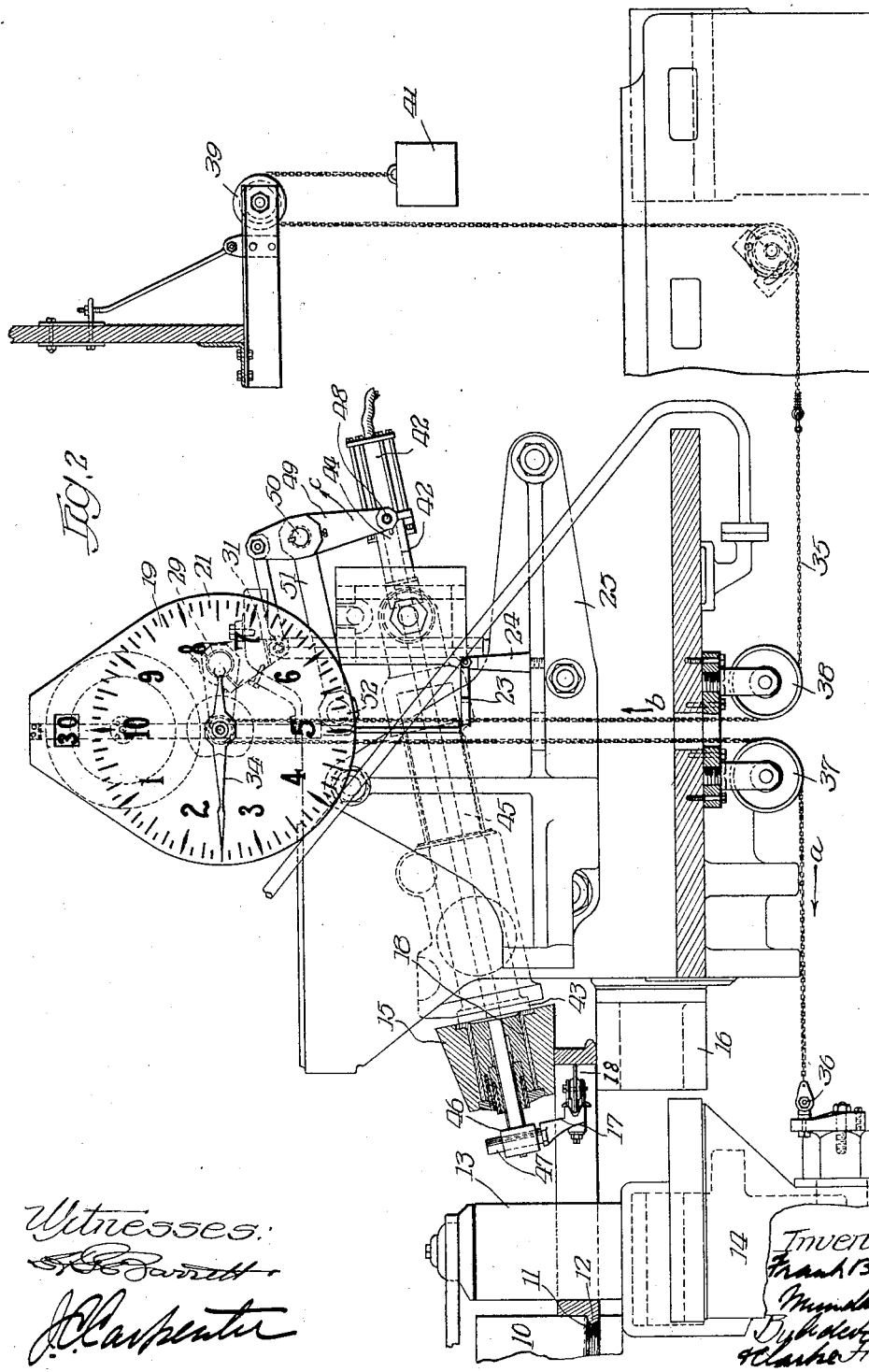

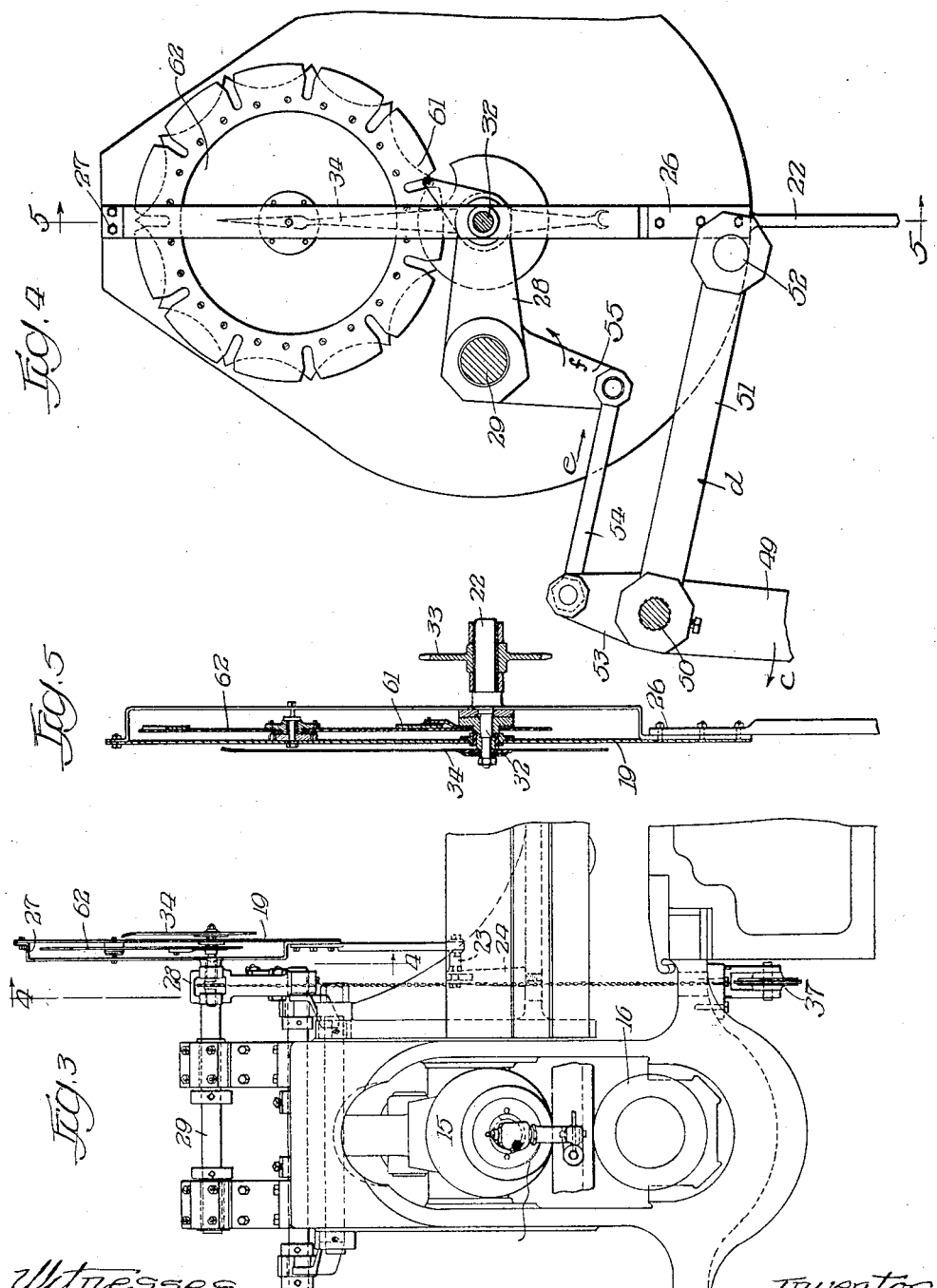

UNITED STATES PATENT OFFICE.

FRANK B. BELL, OF CHICAGO HEIGHTS, ILLINOIS, ASSIGNOR TO EDGEWATER STEEL COMPANY, OF PITTSBURGH, PENNSYLVANIA, A CORPORATION OF PENNSYLVANIA.

MEASURING DEVICE.

1,332,594.     Specification of Letters Patent.     Patented Mar. 2, 1920.

Application filed June 21, 1915. Serial No. 35,272.

*To all whom it may concern:*

Be it known that I, FRANK B. BELL, a citizen of the United States, residing in Chicago Heights, in the county of Cook and State of Illinois, have invented a new and useful Improvement in Measuring Devices, of which the following is a specification.

This invention relates in general to the measurement of circles or similar figures of constantly varying diameters while bodily shifting and has more particular reference to the measuring of the diameters during rolling of tires for car and locomotive wheels and the like.

Tires for car and locomotive wheels are frequently constructed by providing an ingot or blank perforated at its center and containing sufficient material to form the continuous tire of required dimensions. The ingots or blanks pass through ordinarily a number of rolling mills, each mill increasing the diameter and in some instances bringing it to proper flanged configuration. In all of the mills through which the tire in its various stages of formation passes it is operated upon while heated, and in the last or finishing mill it is rolled against a fixed roll and a number of other movable rolls shiftable as the diameter of the tire becomes larger. These rolls are of course operated under high pressure so that the dimensions produced by the rolls are readily maintained in a desired relation of sufficient accuracy to meet the requirements. One of the rolls being fixed, requires that the center of the tire shift bodily as it becomes larger. The finished tire is removed from the finishing mill when its internal diameter has reached the predetermined desired length.

Prior to my invention it has been generally the custom to determine this internal diameter through the use of a bar or rod cut to a length somewhat less than the desired diameter. This rod is held against one side of the tire being rolled and the other end is swung into contact with the opposite side in each direction, the amount of its swing determining the desired diameter. It will be manifest that this method and means of measuring a tire depends for accurate use upon the eye and skill of the person in control of the mill and at best can merely be of approximate accuracy. It has the further disadvantage of requiring an attendant to make several trial measurements and therefore requires the constant attention of the mill operator. This procedure therefore is tedious, and although possibly of sufficient accuracy in the hands of a skilled mill operator, is wholly unadapted for use by the ordinary mechanic without special training and long experience.

It is a principal object of this invention to provide means for automatically indicating the diameter of tires for car and locomotive wheels and the like as the diameter changes and without difficult manipulation by the mill operators, such device being capable of efficient and accurate use by any mechanic and without previous continued practice.

Other objects and advantages of the invention will be apparent as it is better understood from the following description when considered in connection with the accompanying drawings illustrating a preferred embodiment thereof.

Referring to the drawings,

Figure 1 is a top plan view of a mill equipped with a measuring device embodying my invention;

Fig. 2 is a partial longitudinal sectional view thereof;

Fig. 3 is an end elevation of the same;

Fig. 4 is an enlarged section taken substantially on the lines 4—4 of Fig. 3;

Fig. 5 is a section taken substantially on the lines 5—5 of Fig. 4; and

Figs. 6 and 7 are detail views of the cylinder.

It is believed that the rolling mill need only be described generally to permit a full understanding of the embodiment of the invention shown on the drawing. In the present instance the mill comprises a fixed roll 10 mounted vertically and grooved at 11 to define the tire flange 12. The tire is rolled against this roll to determine its thickness by means of a companion vertical roll 13 mounted upon a suitable carriage generally designated at 14 in order that the roll 13 may move toward the roll 10 as the thickness of the tire diminishes. The mechanisms for causing this movement and supplying suitable power are not shown on the drawing, as they form no part of my present invention. The width of the tire in the present instance is shown as determined by a pair of rolls 15 and 16, although usually more and other rolls are employed. It will be understood that the description of the mill itself includes merely such parts as are thought to be necessary for an understanding of the invention. Viewing Fig. 2 it will be readily understood that as the rolling of the tire progresses its diameter increases, and that the internal diameter shifts bodily toward the fixed roll as the thickness of the tire diminishes. In measuring the diameter therefore it is necessary to take into account two constantly shifting points, one located at each end of a diameter, the diameter selected preferably extending from the nearest point to the fixed roll 10 to the diametrically opposite point. The alterations in diameter are the sum of the two movements of these points in the line of the diameter selected, or they may be considered the summation of the movements of the two points from the adjacent surface of the fixed roll 10. One of these movements is determined by the movement of the roll 13, which constitutes a following member in the measuring device, and the movement of the other of these points is determined by a second following member 17 carrying a wheel 18 having a caster mounting rolling upon the inner surface of the tire at the opposite side. The effect of these two movements is felt in direct proportion by an accumulator generally indicated at 19 which will be now described.

A dial-face or plate 21 is rigidly mounted upon a stem or support 22 connected by a link 23 to a standard 24 carried by the main frame 25 of the mill. The stem 22 is fastened at 26 and 27 to the rear of the dial-face, and is further supported by a lever 28 having a fixed pivotal bearing 29 on a bracket 31 from the main frame. The lever 28 is a bell crank lever and one arm is pivoted at 32 in the stem or support 22. The link 23 and the lever 28 are so arranged that the accumulator may be shifted vertically for a purpose to be later described and yet prevented from tilting or being moved from upright position. The accumulator carries a gear or sprocket wheel 33 fixed upon the pivot 32 which is loose in the bell crank 28. The pivot pin extends through the dial 19 and carries an indicating hand 34.

A sprocket chain 35 is secured at one end, 36, to the carriage 14 of the roll 13 and from there passes about an idle pulley 37 just beneath the accumulator. From the pulley 37 the sprocket chain passes about the gear wheel 33 and back around a second idle pulley 38, the pulleys 37 and 38 forming a loop in the sprocket chain about the pulley 33. From the pulley 38 the sprocket chain passes through any desired connections to the pulley 39 over which it is trained. At its end beyond the pulley 39 a weight 41 is suspended which retains the sprocket chain in predetermined tension and permits its ready movement in the operation of the measuring device.

It will be manifest from the foregoing that movement of the roll 13 in the rolling of a tire will produce movement of the sprocket chain 35 in the direction of the arrow $a$ in Fig. 2, such movement causing a corresponding movement of the indicator finger upon the dial-face.

It is intended that movement of the following member 17 will cause the accumulator to be lifted vertically. This movement produces a movement of the sprocket chain in the direction of the arrow $b$ through the accumulator and a corresponding movement of the finger 34. The vertical movement is given the accumulator through an air or hydraulic cylinder 42. This cylinder is movable with the following member 17 and to this end is secured upon the end of a rod 45 extending through the shaft 43 of the roller 15. The cylinder moves upon a piston 44 under the influence of a suitable actuating fluid, the piston 44 being stationary with respect to the shaft 43 and embracing the end of the rod 45, a suitable key or other securing means 40 extending through a slot in the piston stem and being fastened to the cylinder and to the rod 45. The cylinder is connected at 48 with a lever 49 pivoted at 50 on the end of a link 51 which in turn is pivoted on the main frame at 52. The other end 53 of the lever 49 is connected by a link 54 with the arm 55 of the bell crank 28. Increase in the internal diameter of the tire will permit a movement of the lever 49 as indicated by the arrows $c$, Figs. 2 and 4. This produces movement in the links 51 and 54 as indicated respectively by the arrows $d$ and $e$ and gives to the bell crank a movement as indicated by the arrow $f$ which lifts it in amount corresponding with the change of dimension in the tire as felt at the end of the diameter at which the following member 17 is positioned.

The shaft or pivot 22 is connected through a Geneva movement 61 with a tens dial 62.

It will be manifest that in the actuation of the device the size of the circle is determined with reference to the adjacent face of the fixed roll 10, the approach of the roll 13 with respect thereto and the movement of the wheel 18 away therefrom being constantly added to accurately indicate the diameter. The circle measured shifts toward the roll 10 by reason of the diminished thickness and away from the roll 10 by reason of the increased diameter. The resultant of these differing and constantly changing quantities is indicated by the accumulator, one following member 13 acting directly thereupon by virtue of its connection through the chain 35 and the other indirectly thereupon by influence exerted upon the chain 35 through the air or hydraulic cylinder and connecting mechanism. The accumulator always remains parallel with itself in its various positions through the coöperation of the link 23 and the bell crank 28.

While the invention has been described in connection with the measuring of tires for railway car and locomotive wheels, it will be manifest that it has a much wider use and is capable through proper adjustment for use in connection with the measuring of changing diameters in other articles and in other connections. It may as readily be arranged to measure external as internal diameters, it only being necessary for the purpose of the invention that the following members follow the curve as it varies. If the circle being measured passes a fixed point only a single appropriate following member need be used.

In practice the following member 17 is not maintained in operative position until the desired dimension is nearly reached. This is controlled by the air in the cylinder, release of which permits the following member 17 to move from measuring position.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. A device for measuring circles having increasing diameters and shifting centers comprising a member moving with each end of the diameter, and an accumulator connected to both members, both of said members moving with relation to said accumulator in the line of shift of the center of the circle being measured.

2. A device for measuring circles having increasing diameters and shifting centers comprising a member moving with each end of the diameter, and an accumulator connected to both members, said members moving in opposite directions and both moving with respect to the accumulator and in the line of shift of the center of the circle being measured.

3. A device for measuring circles having changing diameters and shifting centers comprising a member arranged to follow the movement of each end of a diameter, and an accumulator for indicating said diameter, said accumulator receiving accumulating movement from each said member.

4. A device for measuring circles having a varying diameter, and shifting centers comprising a plurality of members mounted to move with different points of the circumference of said circle, and means for constantly indicating the diameter of said circle through the summation value of the movements of said members.

5. A device for measuring circles of varying diameter and having a shifting center, comprising members moving with predetermined points on the circumference, an indicator actuating element, and connections for imparting to said indicator actuating element movements in the same direction and corresponding to the individual movements of said members.

6. A device for measuring circles of varying diameter and shifting bodily, said device comprising a member movable with the bodily shift of said circle, a member movable with the increased diameter plus the bodily shift of said circle, and an accumulator with respect to which both said members move in measuring for indicating the summation values of said movements.

7. A device for measuring circles of varying diameter and shifting bodily, comprising members following the movement of each end of a diameter of said circle, a stationary accumulator, and separate connections between said accumulator and each shifting member for actuating said accumulator and indicating the summation values of the movements of said members.

8. A device for measuring circles of varying diameter and shifting bodily, comprising members following the movement of each end of a diameter of said circle, a stationary accumulator, and separate connections between said accumulator and said shifting member for indicating the summation values of the movements of said members, one of said connections comprising a motor for causing indication by said accumulator of said value.

9. A device for measuring circles of varying diameter and shifting bodily, comprising members following the movement of each end of a diameter of said circle, a stationary accumulator, and separate connections between said accumulator and said shifting member for indicating the summation values of the movements of said members, one of said connections comprising a motor for causing indication by said accumulator of said value and the other connection producing additional actuation of said motor.

10. A device for measuring circles of varying diameter and shifting bodily, comprising following members mounted to move respectively with each end of a diameter of said circle, an accumulator, a flexible member passing through said accumulator and connecting with one of said following members, movement of said following member producing corresponding movement of said flexible member through said accumulator, and means for moving said accumulator in accordance with the movement of the other following member to produce a corresponding relative movement between said accumulator and said flexible member.

11. A device for measuring circles of varying diameter and shifting bodily, comprising following members mounted to move respectively with each end of a diameter of said circle, an accumulator, a flexible member passing through said accumulator and connecting with one of said following members, movement of said following member producing corresponding movement of said flexible member through said accumulator, means for moving said accumulator in accordance with the movement of the other following member to produce a corresponding relative movement between said accumulator and said flexible member, and means for permitting movement of said flexible member under predetermined and even tension.

12. A device for measuring a dimension constantly increasing and while its center shifts on its length comprising a member located to coincide continuously with each end of said dimension, a stationary accumulator for indicating the summation values of the movements of said members, and connections between said members and said accumulator, said connections imparting independent movement to said accumulator simultaneously.

13. A device for measuring a dimension constantly increasing in length and while its center shifts on its length comprising a member located to coincide continuously with each end of said dimension, a stationary accumulator for indicating the summation value of the movements of said members, and connections between said members and said accumulator for imparting independent movement to said accumulator simultaneously.

14. A device for measuring the internal diameters of objects enlarging and decreasing in thickness comprising a member disposed within a said object and moving from its center in accordance with the decreasing thickness of said object, and a second member engaging within said object and moving in accordance with the increasing of said object, a stationary accumulator, and connections between said members and accumulator for indicating the summation value of the movements of said members.

15. A device for measuring internal dimensions of objects changing in internal area and in thickness comprising a fixed point of reference without said object, a member movable toward said point and in accordance with the change in the thickness of said object and a member movable from said point in accordance with the change of internal area, and an accumulator stationary with respect to said point of reference for indicating the summation of the movements of said members.

16. A device for measuring circular hollow objects internally during rolling comprising a fixed roll, a roll movable toward said fixed roll, said movable roll rolling said object against said fixed roll to decrease its thickness and increase its diameter, a member engaging the inner face of said object at a point remote from the engagement of said movable roll, and a stationary accumulator connected to said movable roll and said member for indicating the changing diameter of said object.

17. A device for measuring the changing internal diameter of a circular object being rolled comprising a fixed roll in contact with the outer circumference of said object, a movable roll in contact with the inner circumference and disposed adjacent said fixed roll, a support for and movable with said movable roll, a member engaging the inner circumference at a distance remote from said movable roll, an accumulator connected with said member and connected with said movable roll through said support.

18. A device for measuring circles of increasing diameter and shifting center comprising two members respectively following the movements of the end of said diameter, an accumulator for indicating the summation value of the movements of said members, said accumulator comprising a moving actuating device directly connected to one of said members, an actuated element engaged by said device for indicating movement of said actuating device and means for moving said actuated element with respect to said actuating device to indicate the movement of the other of said members.

19. A device for measuring circles of increasing diameter and shifting center comprising two members following respectively the ends of a diameter, an accumulator for indicating the summation value of the movements of said members, said accumulator comprising an indicator, a device for actuating said indicator and movable with one of said members, said device moving through said indicator in accordance with the movement of its member and means for moving the indicator along said device in accordance with the other of said members.

20. A device for measuring circles of increasing diameter and shifting center comprising two members following respectively the ends of a diameter, an indicator, an element moving through said indicator to actuate the same and in accordance with the movement of one of said members, and means for moving said indicator along said element to actuate the indicator in accordance with the movement of the other of said members.

21. A device for measuring circles of increasing diameter and shifting center comprising two members following respectively the ends of a diameter, an indicator, an element moving through said indicator to actuate the same and in accordance with the movement of one of said members, and means for moving said indicator along said element to actuate the indicator in accordance with the movement of the other of said members, the movements of said element and said indicator being adapted to occur simultaneously and under independent direction of said members.

22. A device for measuring circles of increasing diameter and shifting center comprising two members movable respectively with the ends of a diameter, an indicator, a flexible actuator for said indicator connected with one of said members and adapted to be drawn through said indicator to indicate the movement of said member, and means for moving said indicator along said flexible actuator to actuate said indicator to indicate the value of the movement of the other of said members.

23. A device for measuring circles of increasing diameter and shifting center comprising two members adapted respectively to follow the ends of a diameter, and an accumulator comprising an actuator, an indicator actuated thereby, said actuator being connected directly with one of said members, the movement of said member moving said actuator past said indicator to actuate the indicator and the other of said members being connected to said indicator to cause movement of the indicator along said actuator to produce actuation of the indicator by action of said actuator in accordance with the movement of said last mentioned member.

24. In a rolling mill for locomotive tires and the like, the combination of a fixed external roll, a movable coöperating internal roll for decreasing the thickness of the tire and enlarging its diameter, an indicator, a connection between said indicator and said movable roll for producing movement of the indicator in accordance with the movement of said roll, rolls for determining the width of said tire or like object, and an internal roll disposed adjacent said determining rolls and connected with said indicator for indicating the enlargement of the tire with said determining rolls, said indicator serving to indicate the diameter through the two movements imparted to the indicator.

25. The process of manufacturing locomotive tires and the like, which consists in enlarging the size of the tire by pressing it against a fixed roll and preserving its width by movable rolls and determining the size of the tire from the relative positions of said movable rolls.

26. The process of manufacturing locomotive tires and the like, which consists in rolling the tire and maintaining throughout the rolling operation an indication determined by movement of the rolls in operation of the length of the diameter as it increases.

27. The process of measuring circles of increasing diameter and having shifting centers, which consists in utilizing a point of reference on the line of shift of the center of such circle and obtaining a summation value of the movements of the points of intersections of the circumference and said line.

28. In a tire mill the combination of a plurality of rolls for rolling the tire blank into a finished tire and an indicating device actuated by members attached to other rolls in their movements for determining the diameter of the tire at its completion.

29. In a tire mill the combination of a plurality of rolls for rolling the tire blank into a finished tire and a measuring device actuated by members attached to other rolls in their movements for constantly indicating the increasing diameter of the blank as it is formed into a completed tire.

30. In a tire mill, the combination of a fixed external roll for rolling a tire, an internal roll coöperating therewith, and a device located at a fixed external point for indicating the increasing diameter of the tire being rolled, said device indicating the shift of the internal circumference under the action of said internal moving roll.

31. In a locomotive tire mill, the combination of a plurality of rolls for shaping the tire, one of said rolls being fixed and located without the tire the internal circumference of the tire in its rolling movement shifting bodily, and a device for measuring its internal diameter, said device comprising a member following each end of the diameter and an accumulator separately actuated by each member and indicating the summation value of other movements.

32. In a locomotive tire mill, the combination of rolls for forming the tire, one of which is external and fixed, an internal roll for decreasing the thickness of the tire material and increasing its diameter, and a stationary measuring device comprising a plurality of members movable in accordance with the shift of different points on the circumference of the circle and means for indicating the internal diameter of said tire through the summation value of the movements of said members.

33. In a locomotive tire mill, the combination of forming rolls and a measuring device comprising a plurality of members mounted to move with different points of the internal circumference of the tire, and means located at a final point outside the roll organization for constantly indicating the diameter of said circle through the summation value of the movements of said members.

In testimony whereof I have hereunto set my hand in the presence of two subscribing witnesses.

FRANK B. BELL.

Witnesses:
J. C. CARPENTER,
ESTHER ABRAMS.